United States Patent
Sprigg

(10) Patent No.: US 8,185,307 B2
(45) Date of Patent: May 22, 2012

(54) SYSTEM AND METHOD FOR SENDING DESTINATION LOCATIONS TO NAVIGATION DEVICES

(75) Inventor: Stephen A. Sprigg, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 12/896,154

(22) Filed: Oct. 1, 2010

(65) Prior Publication Data

US 2011/0022315 A1   Jan. 27, 2011

Related U.S. Application Data

(62) Division of application No. 11/563,045, filed on Nov. 24, 2006, now Pat. No. 7,877,204.

(51) Int. Cl.
*G01C 21/00* (2006.01)
(52) U.S. Cl. .................. 701/468; 701/400; 701/408
(58) Field of Classification Search .......... 701/200–202, 701/213–215, 207–211, 400, 408, 412, 468; 340/988
See application file for complete search history.

(56) References Cited

U.S. PATENT DOCUMENTS

| | | | | |
|---|---|---|---|---|
| 6,107,944 | A * | 8/2000 | Behr et al. | 340/995.12 |
| 6,463,382 | B1 | 10/2002 | Bullock | |
| 7,089,110 | B2 * | 8/2006 | Pechatnikov et al. | 701/210 |
| 7,877,204 | B2 | 1/2011 | Sprigg | |
| 2005/0159888 | A1 * | 7/2005 | Miyata | 701/209 |
| 2006/0159235 | A1 | 7/2006 | Eisner et al. | |
| 2007/0252689 | A1 | 11/2007 | Rothschild | |

FOREIGN PATENT DOCUMENTS

| | | |
|---|---|---|
| CN | 1329738 | 1/2002 |
| CN | 1588476 | 3/2005 |
| DE | 19601334 | 7/1997 |
| DE | 19920227 A1 | 11/2000 |
| DE | 102004005213 A1 | 8/2005 |
| DE | 102006007921 | 10/2006 |
| EP | 1298621 | 4/2003 |
| EP | 1640902 | 3/2006 |
| JP | 9196696 | 7/1997 |
| JP | 09196696 | 7/1997 |

(Continued)

OTHER PUBLICATIONS

International Search Report—PCT/US07/085302—International Search Authority—European Patent Office. Sep. 8, 2008.

(Continued)

*Primary Examiner* — Yonel Beaulieu
(74) *Attorney, Agent, or Firm* — Nicholas A. Cole

(57) ABSTRACT

A navigation device receives a destination location to automatically calculate a route to the destination location over a wireless network. The destination location may be generated by a third party at a remote computer or wireless device. The destination location may be entered into the remote computer or wireless device, or may be automatically generated by the device. The destination location is transmitted from the remote computer or wireless device to the navigation device. Once received, the user of the navigation device may have the option of accepting or rejecting the destination location. The navigation device then uses the destination location to calculate a route which is communicated to the User with minimal to no user interaction. Multiple destinations may be sent to the navigation device, thus allowing advanced programming of an entire trip.

80 Claims, 6 Drawing Sheets

FOREIGN PATENT DOCUMENTS

| | | | |
|---|---|---|---|
| JP | 2002298289 | A | 10/2002 |
| JP | 2003106854 | A | 4/2003 |
| JP | 2003331394 | A | 11/2003 |
| JP | 2006107421 | A | 4/2006 |
| WO | WO2008057969 | | 5/2008 |

OTHER PUBLICATIONS

Written Opinion—PCT/US07/085302—International Search Authority—European Patent Office. Sep. 8, 2008.

OnStar Owner's Guide (Sep. 28, 2006), 48 pp., 17572 R17; published by OnStar Subsciber Services, Troy, MI.

European Search Report—EP11179378—Search Authority—Munich—Oct. 7, 2011.

European Search Report—EP11179379—Search Authority—Munich—Oct. 10, 2011.

* cited by examiner

SYSTEM AND METHOD FOR SENDING DESTINATION LOCATIONS TO NAVIGATION DEVICES

This application is a divisional of U.S. application Ser. No. 11/563,045, filed Nov. 24, 2006, entitled "SYSTEM AND METHOD FOR SENDING DESTINATION LOCATIONS TO NAVIGATION DEVICES", now U.S. Pat. No. 7,877,204, the entire contents of which are hereby incorporated by reference.

FIELD

The present invention generally relates to navigation devices and, more particularly, to the remote programming of navigation devices.

DESCRIPTION OF THE RELATED ART

Navigation devices have the ability to pinpoint their location virtually anywhere on the planet using global positioning system (GPS). Navigation devices can tell the user their current latitude and longitude coordinates or even their nearest street address. Some navigation devices are integrated into modern cars in order to provide real-time navigation assistance. Many navigation devices also allow users to input destinations by using a keypad or a touchscreen. The navigation device then displays the desired destination on a map and provides directions to the location for the user using audio or text.

With current navigation devices, inputting data such as longitude and latitude coordinates or street addresses for destinations is overly cumbersome for users. It is difficult for users to use small, inadequate keypads or non-user-friendly touchscreens to input destinations. Users become easily frustrated, which results in diminished usability of navigation devices. Furthermore, inputting a destination while driving is extremely dangerous because the driver needs to stay focused on safely operating the vehicle.

Additionally, it is inconvenient to program destination locations supplied by third parties. For example, Dad is already on the road, running errands with the kids. Mom calls and asks him to quickly pick up tickets to tonight's symphony performance before they sell out. Since Dad does not know the location of the concert hall, he wants to use his navigation device to assist him. However, because he is on the freeway doing sixty-five miles per hour, he asks Mom to hold while he safely exits the freeway and finds a place to park. Then, he asks for the address again, but Mom cannot remember it exactly, so she puts Dad on hold while she looks it up. A few minutes later, she tells him the address, and he inputs it into his navigation device. The location appears on the display, and Dad gets back on the freeway, heading for the concert hall. Unfortunately, by the time he arrives, the tickets have just sold out.

What is needed is a system that allows users to input destinations into navigation devices remotely. A user can program their destination from a user-friendly device such as a personal digital assistant (PDA), personal computer (PC), or other similar devices. Moreover, destinations may be sent to the navigation device remotely by third parties while the user of the navigation device is already in transit and unable to manually input destinations.

SUMMARY OF THE INVENTION

One embodiment includes a method of providing a destination location to a navigation device. The method comprises presenting an interface from a server to a computing device, generating the destination location at the computing device using the interface, sending the destination location from the computing device to the server, wirelessly transmitting the destination location from the server to the navigation device, and generating a route by the navigation device based on the destination location. The method may also associate additional data with the destination location. The method may also wirelessly transmit the destination location from the server to a plurality of navigation devices. At least one of the plurality of navigation devices may selectively or automatically receive the destination location.

Another embodiment includes a method of providing a destination location to a navigation device from a telephone. The method comprises receiving a telephone call at a server and generating the destination location from the telephone call. The destination location is then wirelessly transmitted to the navigation device, where a route is generated by the navigation device based on the destination location. The method may also associate additional data with the destination location. The destination location could be generated using caller-ID. The method may also wirelessly transmit the destination location from the server to a plurality of navigation devices. At least one of the plurality of navigation devices may selectively or automatically receive the destination location.

Another embodiment includes a method of providing a destination location to a navigation device. The method comprises generating the destination location at a computing device, wherein the destination location is a current location of the computing device, and wirelessly transmitting the destination location from the computing device to the navigation device. The navigation device then generates a route based on the destination location. The method may also generate the current location at the computer device using global positioning system. The method may also associate additional data with the destination location. The method may also wirelessly transmit the destination location from the server to a plurality of navigation devices. At least one of the plurality of navigation devices may selectively or automatically receive the destination location.

Another embodiment includes a navigation device comprising a receiver, capable of receiving a destination location from a server over a wireless network, and a processor which generates a route based on the destination location. The destination location is generated on a computing device, and the computing device and navigation device are not the same device. The navigation device may also have an interface which communicates the route to a user. The processor may also be capable of processing additional data associated with the destination location.

Another embodiment includes a computing device comprising a processor capable of generating a destination location and a connection capable of interacting with an interface presented by a server and sending the destination location through the interface to the server. The destination location is capable of being processed by one or more target navigation devices which may generate a route based on the destination location, wherein the one or more navigation devices and the computing device are not the same device. The server and the computing device are not the same device. The computing device may also have an interface which is adapted to accept user input of the destination location. The connection may also be capable of sending the destination location over a wireless network. The processor may also be capable of generating the destination location automatically based on a current location of the computing device. The current location may be determined using a global position system.

Another embodiment includes a server comprising a connection capable of receiving a destination location from an origination device and wirelessly transmitting the destination location to one or more target navigation devices. The destination location is capable of being processed by one or more target navigation devices to generate a route to the destination location. The origination device and the one or more target navigation devices are not the same device. The server may also have an interface which is presented to the originating device through the connection for generating the destination location at the originating device.

Another embodiment includes a navigation device comprising means for receiving a destination location from a server over a wireless network and means for generating a route based on the destination location. The destination location is generated by a computing device wherein the navigation device and computing device are not the same device. The navigation device further comprising a means for communicating the route to a user. The navigation device further comprising a means for processing additional data associated with the destination location.

Additional embodiments will be apparent in the foregoing description and equivalents thereof.

DETAILED DESCRIPTION

In this description, the terms "destination," "location," and "destination location" are used interchangeably. The word "exemplary" is used herein to mean "serving as an example, instance, or illustration." Any embodiment described herein as "exemplary" is not necessarily to be construed as preferred or advantageous over other embodiments.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

In this description, the terms "communication device," "wireless device," "wireless telephone," "wireless communications device," and "wireless handset" are used interchangeably. With the advent of third generation (3G) wireless technology, more bandwidth availability has enabled more electronic devices with wireless capabilities. Therefore, a wireless device could be a cellular telephone, a pager, a PDA, a smartphone, or a computer with a wireless connection.

Figure 1:
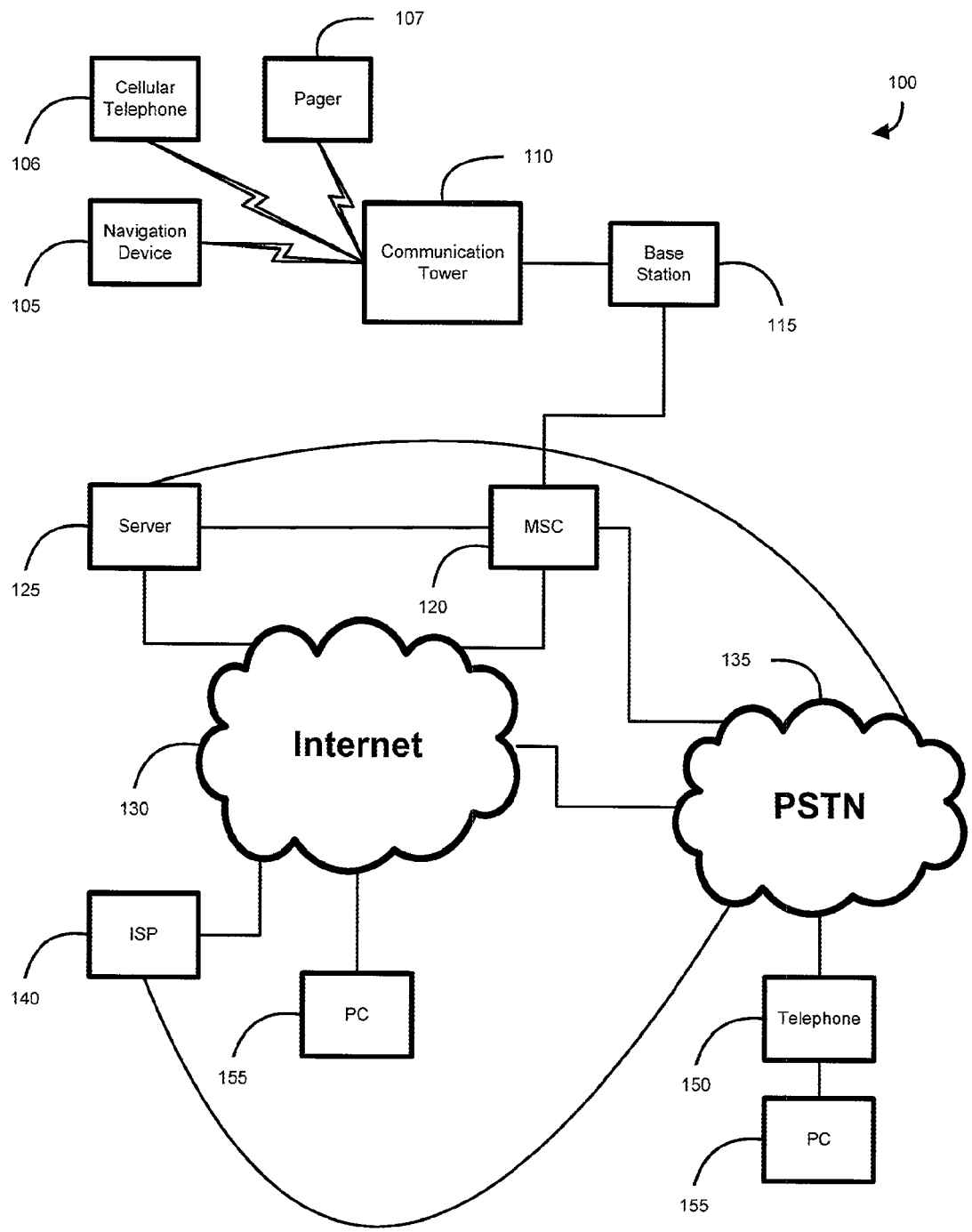
FIG. 1 is a diagram of a system for remotely programming navigation devices.

FIG. 1 depicts an exemplary communication network 100 for programming destination information into a navigation device. The communication network 100 includes a wireless communications network, a public switched telephone network (PSTN) 135, and the Internet 130.

The wireless communications network includes a plurality of communication towers 110, each connected to a base station (BS) 115 and serving a plurality of navigation devices 105, cellular telephones 106, pagers 107, or other wireless devices. A navigation device 105 can be a stand-alone device or can be integrated into a cellular telephone, a pager, a PDA, a laptop, or other portable electronic devices at least capable of determining its location and communicating with other electronic devices. The navigation device 105 may be capable of storing multiple locations as saved destinations. Commands and data may be transmitted between the navigation device 105 and the communication tower 110. Communication between the navigation device 105 and the communication tower 110 can be based on different technologies, such as code division multiplexed access (CDMA), time division multiplexed access (TDMA), frequency division multiplexed access (FDMA), orthogonal frequency division multiplexed access (OFDMA), global system for mobile communications (GSM), or other technologies that may be used for the wireless communication. The data received by the communication tower 110 is sent to a BS 115 and then forwarded to a mobile switching center (MSC) 120, which is connected to the Internet 130 and the public switched telephone network (PSTN) 135.

The PSTN 135 is connected to the Internet 130, a server 125, an Internet Service Provider (ISP) 140, and the wireless communication network through the MSC 120. The PSTN 135 supports users accessing the Internet 130 using a PC 155 through dial-up services by enabling them to use a telephone line 150 to access the ISP 140. The ISP 140 provides connection between the user at the PC 155 and the Internet 130. Alternatively, the PC 155 may access the Internet 130 through high-speed data connections such as digital subscriber line (DSL), T1 connection, etc. Many other devices could perform the tasks of the PC 155, such as a PDA, a tablet PC, a laptop, a smartphone, etc. Therefore, the PC 155 could be replaced by any one of these devices in alternative embodiments.

The Internet 130 is a high-speed data network. The PC 155 may access the Internet 130 either directly (by connecting to a hub on the Internet 130) or indirectly (through the ISP 140). A server 125 may be connected directly or indirectly to the Internet, the MSC 120, or the PSTN 135.

The server 125 is present on the Internet 130 and can be reached by other PCs 155 connected to the Internet 130 using the standard Internet protocol (IP) suite. The server 125 is able to store destination locations, messages, and other data which it shares between the PC 155 and the navigation device 105. In one embodiment, the server 125 could be connected directly to the PSTN 135 and would be able to accept telephone calls directly, which would allow users to call in their destination location requests. In another embodiment, the server 125 could also be connected to the MSC 120 in order to enable devices on the wireless communications network to reach the MSC 120 without having to access the Internet 130.

Figure 2:
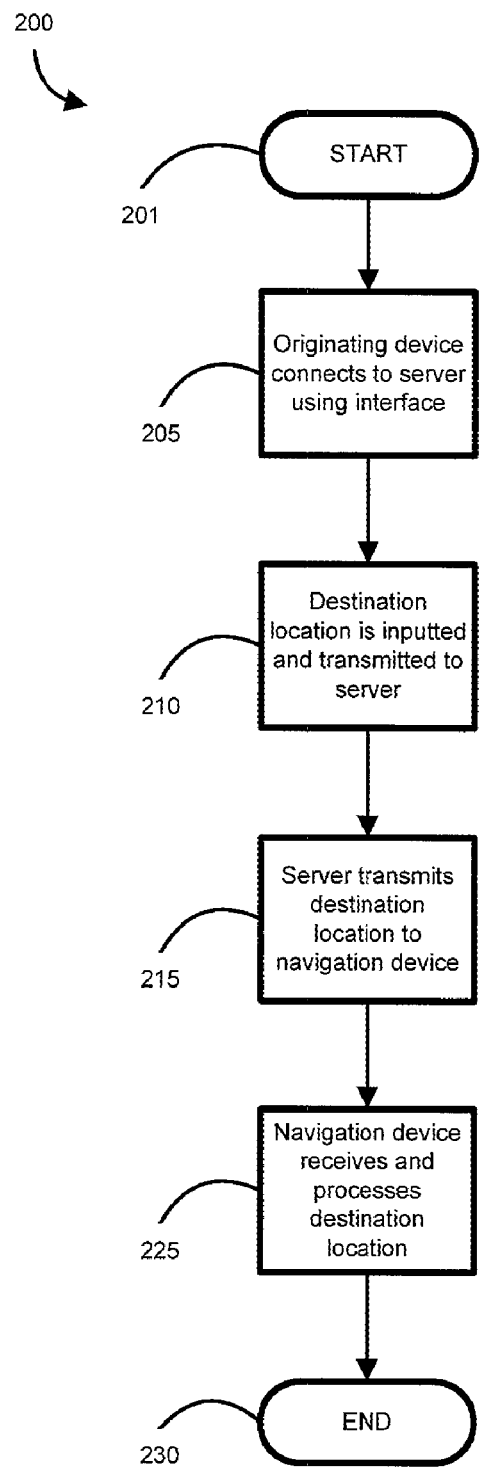
FIG. 2 is a flowchart illustrating the process of using a PC to program a destination location into the navigation device.

FIG. 2 is a flowchart which illustrates the process 200 of a user sending the destination location to the navigation device 105. The destination location may be a street address, a location on a map, or latitude and longitude coordinates. Additional data could be associated with the destination location e.g. a text message, an image, or other data relevant to the destination location. The process 200 begins at a START block 201. Proceeding to block 205, an origination device connects to the server 125. In one embodiment, the origination device could be the PC 155 which connects to the server 125 through a connection to the Internet 130. A webpage interface is presented by the server 125 and allows the entry of the destination location by inputting a street address or by selecting the location directly using a city street map. The webpage interface may also permit a message or other data to be associated with the location e.g. "pick up dry cleaning." Alternative embodiments might include a local PC client application that resides on the PC 155 instead of a remote webpage interface. Multiple interfaces to facilitate information sharing between the PC 155 and the server 125 may be used and would be obvious to one skilled in the art. In another alternative embodiment, the interface would not be required as the server 125 could accept emails or short message service (SMS) messages containing destination location information. Other interfaceless embodiments might exist and would be obvious to one skilled in the art.

Optionally, in block 205, the server 125 might have an authentication process before allowing the PC 155 to connect or send data, which would prevent unauthorized users from sending undesired locations to the navigation device 105. Valid user authentication could be accomplished by public/private keys, shared passwords, whitelists, blacklists, or other methods known to one skilled in the art.

Proceeding to block 210, a destination is input into the interface and transmitted to the server 125. A message or other data may be associated with the location. For example, one roommate could easily let another roommate know that their broken toaster needs replacement by selecting a local department store as the destination location, attaching a picture of the broken toaster, and including the message "please get a new toaster similar to the previous one." Multiple destinations could be entered through the interface in order to program an entire trip in advance. For example, a family could plan a road trip by selecting the locations of hotels, attractions, and restaurants using the interface.

Proceeding to block 215, the server 125 combines the destinations, messages, and any other data into a package, which is then prepared for transmission to the navigation device 105 and transmitted via the Internet 130 or the MSC 120. This transmission may be by SMS, TCP/IP, UDP/IP, email, or any other means obvious to one of skill in the art. Optionally, in alternative embodiments, the location, the message, and the additional data need not be combined into a package as each part may be sent individually to the server 125; however, the rest of this description will use the packaging embodiment for convenience.

The server 125 could send the package to one or more navigation devices 105. In one embodiment, one or more navigation devices 105 selectively allows the user to accept or reject the destination location sent by the server 125. In another embodiment, one or more navigation devices 105 automatically accepts the destination location from the server 125.

Proceeding to block 225, the navigation device 105 receives the transmission and unpacks the destination location, message, and other data from the package. Then, the navigation device 105 may add the unpacked contents to its memory to be retrieved at a later time. In an alternative embodiment, the navigation device 105 may display a notification that a new destination location has arrived, or the navigation device 105 may program the new destination for immediate navigation. The behavior of the navigation device 105 when it receives a new destination location may be pre-programmed by the manufacturer or have user-configurable preferences. The process 200 then terminates in the END block 230.

Figure 3:
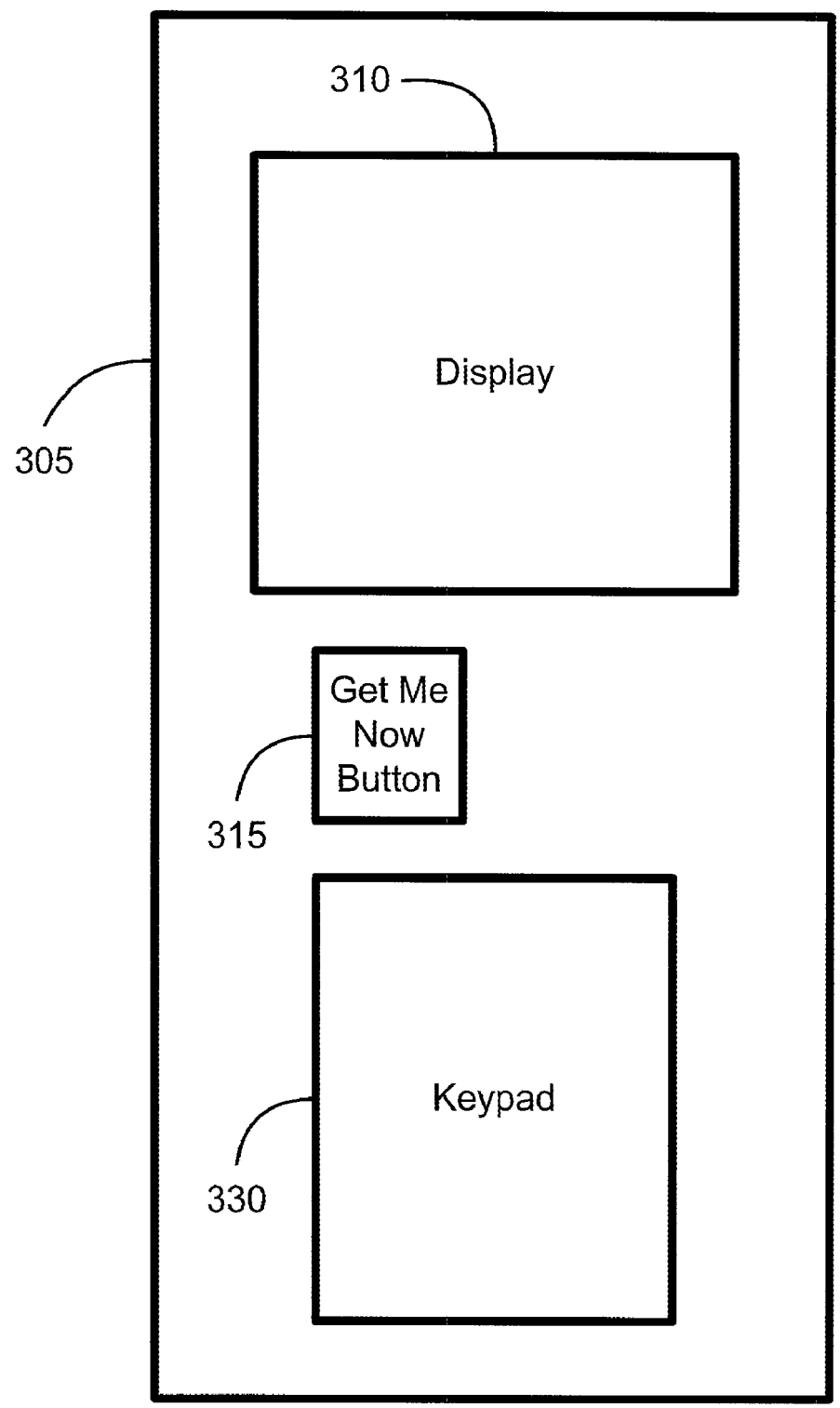
FIG. 3 is a block diagram illustrating a wireless device which may be used to program a destination location into a navigation device.

FIG. 3 is an illustration of a device 305 which has a feature called "Get Me Now," which allows the user to press a button and have their location automatically sent to the navigation device 105. Pre-configured data or other data may also be automatically sent with the destination location. The device 305 only requires the ability to locate itself using GPS and wirelessly exchange information with other devices; however, the device 305 could also be embodied as a fully-functional navigation device 105, with the ability to send destination requests as well as receive them from other navigation devices 105. The device 305 may have a display 310 to present information to the user and a keypad for user input 330. A "Get Me Now" button 315 is located on the face of the device in order for the user to invoke the process of sending a destination to the navigation device 105. In another embodiment, the "Get Me Now" feature could also be invoked using a software interface, display 310, and keypad 330.

Figure 4:
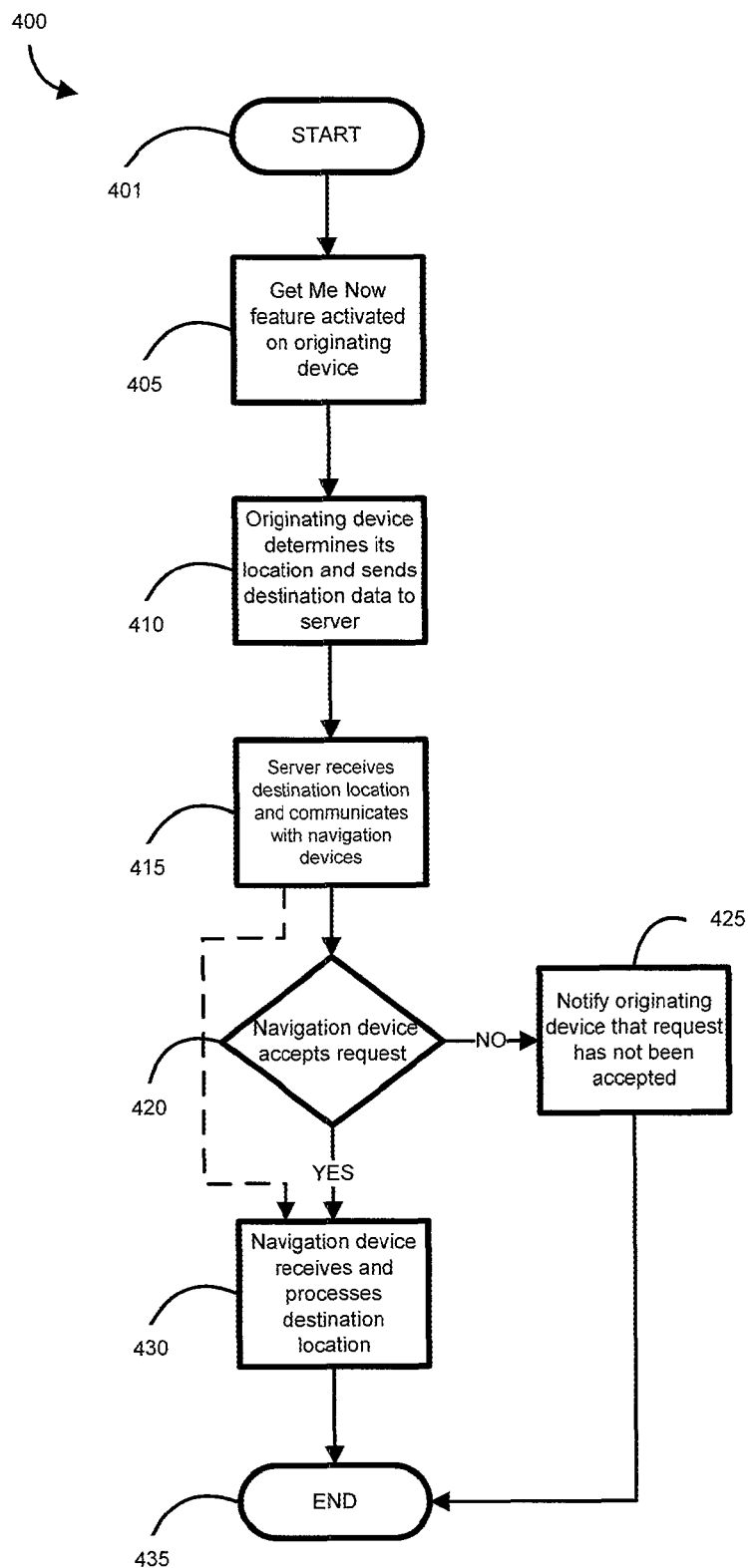
FIG. 4 is a flowchart illustrating the process of using the wireless device in FIG. 3 to program a destination location into the navigation device.

FIG. 4 is a flowchart which illustrates the process 400 of invoking the "Get Me Now" feature in order to send a destination location, message, and other data to the navigation device 105. The process 400 begins at the START block 401. Proceeding to block 405, the "Get Me Now" feature is activated by either pressing a dedicated button on the device 315 or using the software interface, the display 310, and the keypad 330. For convenience, the device 305 invoking the "Get Me Now" request shall be referred to as the "originating device" for the rest of description for the process 400.

Proceeding to block 410, the device 300 determines its location using GPS, triangulation with the communication tower 110 and BS 115, or some other method known to one of skill in the art. Once the location is determined, the device may combine the location with a message and any additional data into a package. Since the "Get Me Now" feature is a user-convenience, the message and other data could be pre-configured in advance. In an exemplary embodiment, a parent could pre-configure a child's "Get Me Now" device 305 to always send the child's name as the message, which would let the parent know which child they are retrieving when the child invokes the "Get Me Now" feature. The originating device transmits the package to the server 125. The package could be sent to the server 125 by SMS, TCP/IP, UDP/IP, email, or other method known to one skilled in the art.

Proceeding to block 415, the server 125 receives the package from the originating device and relays the destination location package created in block 410 to the recipient navigation device 105. The server 125 could relay the package by SMS, TCP/IP, UDP/IP, email, or other method obvious to one of skill in the art. The server 125 may relay the package to one or multiple navigation devices 105 depending on the context of the request generated by the originating device in block 410.

Proceeding to block 420, the recipient may be provided the option of accepting the package. In the simplest case, where the package is routed to one navigation device 105, the recipient navigation device 105 may display the option of accepting the packaged request from block 410. If the recipient navigation device 105 accepts the request, then the process 400 proceeds along the YES branch to block 430. In block 430, an acknowledgement may be sent to server 125 and the location of the originating device is programmed into the recipient navigation device 105. The navigation device 105 may add the request's destination location to its memory to be retrieved at a later time. In an alternative embodiment, the navigation device 105 may display a notification that the new destination location has arrived, or the navigation device 105 may program the new destination location for immediate navigation. The behavior of the navigation device 105 when receiving the new destination location may be pre-programmed by the manufacturer or have user-configurable preferences.

Returning to block 420, if the recipient navigation device 105 rejects the request, a negative acknowledgement may be sent to the server 125, and the process 400 proceeds along the NO branch to block 425. In block 425, no recipient navigation device 105 has accepted the originating device's request as all requests were rejected or timed out. The server 125 notifies the originating device that no one accepted the request.

In another embodiment; the request in block 420 could be forwarded to multiple recipients. There are many methods which the server 125 could use to determine which recipients will receive the request. In one embodiment, the request could be routed to a pre-defined list of navigation devices 105, and within that list, the server 125 could route the request to the nearest navigation device 105, the farthest navigation device 105, any idle navigation device 105, etc. One skilled in the art might devise a unique method of dispatching requests which is not described. The request dispatching method could be established in advance of the originating device invoking the "Get Me Now" feature in block 405 and may vary greatly depending on the context of the requested pick-up.

Returning to block 430, at least one recipient navigation device 105 has accepted the request and may have sent an acknowledgement to the server 125. If the request was sent to multiple navigation devices 105, the server 125 may cancel all pending requests and optionally notify them of the cancellation. The server 125 may notify the originating device that the request for pick-up has been accepted. In another embodiment (indicated by the broken line between blocks 415 and 430), the server 125 does not present the navigation device 105 with the ability to reject the request in which case block 420 is bypassed, and the process 400 proceeds directly from block 415 to block 430. After either acceptance of the request in block 430 or rejection of the request in block 425, the process 400 terminates at the END block 435.

The following is an exemplary use scenario in which taxicabs could get automatically dispatched to pick up a passenger. Assume that the passenger has already pushed the "Get Me Now" button 315 on the device 300 and blocks 405, 410, and 415 have already been completed. Alternatively, a passenger may call a taxi dispatcher using the telephone 150, and the destination location and any additional data may be inputted and transmitted by a central dispatcher using the process 200 described above. Several packages containing the destination location and description of the passenger are transmitted to multiple taxicabs. The drivers of the taxicabs receive a request on their navigation device's displays. The navigation devices 105 ask if the driver would like to fetch this particular passenger at the specified location. The driver can then make an informed decision about retrieving the passenger depending on the size of the taxicab and distance from the passenger. When the first driver accepts the request, their navigation device 105 may send back an acknowledgement, the server 125 may cancel other pending requests, and the passenger may be notified that a taxicab is on its way. In the case where no driver accepts the request after a predetermined time, then the server 125 notifies the passenger that no driver has accepted their request.

Figure 5:
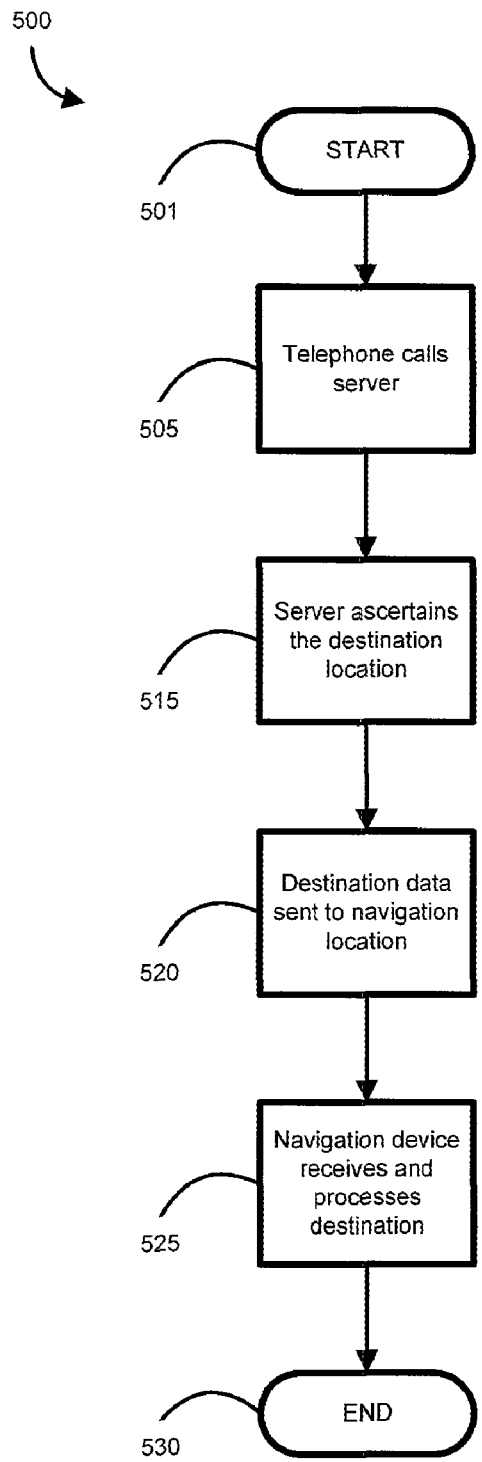
FIG. 5 is a flowchart illustrating the process of using the public switched telephone network to program a destination location into the navigation device.

FIG. 5 is a flowchart which illustrates the process 500 of sending a destination location by telephone. The process 500 begins at a START block 501. Proceeding to block 505, a telephone call is placed using the telephone 150, the cellular phone 106, or any other device capable of communicating across the PSTN 135. The call is connected by the PSTN 135 to the server 125. In one embodiment, the user may be greeted by an automated call system.

Proceeding to block 515, the server 125 ascertains from which street address or latitude and longitude coordinates the user is calling. The process of locating the user can be accomplished by a number of methods. In one embodiment, the server 125 could first use caller-ID to determine the originating telephone number and then cross-reference the telephone number against the street address stored in the public telephone directory. In another embodiment, the system could provide an automated, voice-response system with which the user can interact in order to verbally tell the system their location. One skilled in the art will be able to develop other means by which the user can communicate to the server 125 their location and any other relevant information. Even in a minimalistic embodiment, the system should be capable of at least acquiring or ascertaining the caller's location.

Once the system determines the originating call's location, the server 125 may gather additional information from the caller. The information gathered varies depending on the context of the process 500. For example, if the server 125 is maintained by a local pizza restaurant, then the additional information could be the user's pizza delivery order e.g. large pepperoni with extra anchovies. The additional information is stored as a message and combined with the location into a package, which the server 125 sends to the navigation device 105. One skilled in the art might configure the server 125 to add additional data or information as well.

Proceeding to block 520, the server 125 transmits the package across the Internet 130 or MSC 120 to the navigation device 105. The server 125 could send the package to one or more navigation devices 105. In one embodiment, one or more navigation devices 105 selectively allows the user to accept or reject the destination location sent by the server 125. In another embodiment, one or more navigation devices 105 automatically accepts the destination location from the server 125.

Proceeding to block 525, the package arrives at the target navigation device 105. The navigation device 105 opens up the package and may store the destination location, associated message, and any additional data in its memory. In an alternative embodiment, the navigation device 105 may display a notification that a new destination location has arrived, or it may program the new destination location for immediate navigation. The behavior of the navigation device when it receives a new destination may be pre-programmed by the manufacturer or have user-configurable preferences. The process 500 then terminates in the END 530 block.

Figure 6:
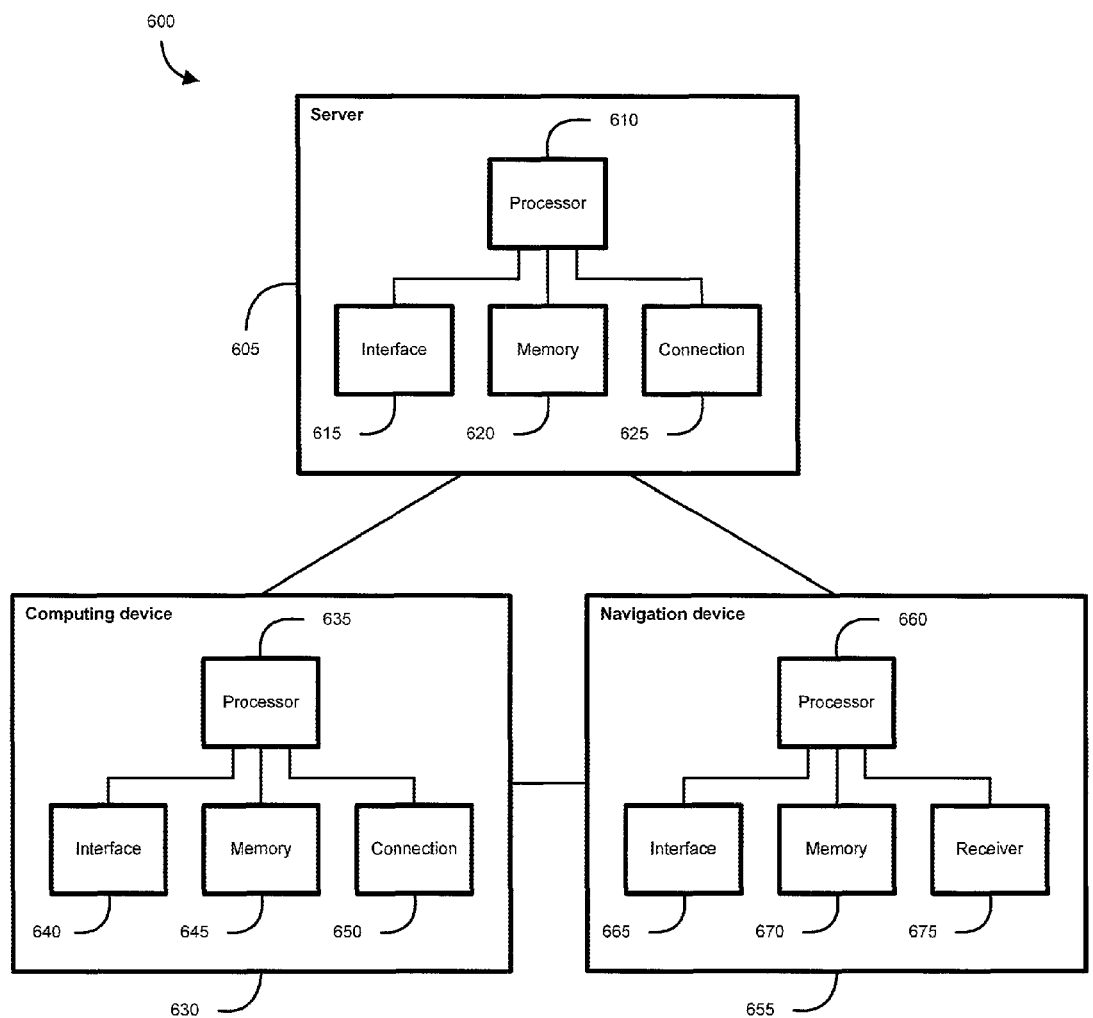
FIG. 6 is a diagram of a computing device, a server, and a navigation device.

FIG. 6 is a block diagram of a system 600, which is comprised of a server 605, a computing device 630, and a navigation device 655. In one embodiment, the computing device 630 could send the destination location directly to the navigation device 655. In an alternative embodiment, the computing device 630 could indirectly send the destination location to the navigation device 655 by first sending the destination location to the server 605, which then transmits the destination location to the navigation device 655. The destination location could be sent by SMS, TCP/IP, UDP/IP, email, or other method known to one of skill in the art.

The server 605 has a processor 610, an interface 615, a memory 620, and a transceiver 625. The processor 610 may adapt the destination location for consumption and processing by the navigation device 655. The connection 625 may receive the destination location from the computing device 630 and may transmit the destination location to the navigation device 655. The connection 625 could be embodied as a local area network (LAN) connection, a modem connection, a wireless connection, or other similar connection at least capable of receiving the destination location and transmitting the destination location over a wireless network. The interface 615 may be a keyboard, a mouse, a touchscreen, a webpage, a client/server application, or other interface capable of accepting the destination location. The server 605 may provide the interface 615 through the connection 625 in order for destination location to be programmed remotely from the computing device 630. In one embodiment, the interface 615 could be a webpage interface. The destination location may be stored in the memory 620.

The computing device 630 has a processor 635, an interface 640, a memory 645, and a connection 650. The computing device 630 could be embodied as a PC, a cellular telephone, a PDA, a laptop, or a similar device capable of generating the destination location. The processor 635 generates the destination location for transmission to either the server 605 or the navigation device 655. The interface 640 facilitates input of the destination location and could be embodied as a keypad, a touchscreen, a voice response system, a mouse, a keyboard, or a similar device capable of accepting input. The memory 645 may store destination location for retrieval at a later time. The connection 650 is capable of sending the destination location to either the server 605 or the navigation device 655. The connection 650 could be embodied as a local area network (LAN) connection, a modem connection, a wireless connection, or other similar connection at least capable of receiving the destination location and transmitting the destination location over a wireless network.

The navigation device 655 has a processor 660, an interface 665, a memory 670, and a receiver 675. The navigation device 655 could be embodied as a stand-alone device or integrated as part of a PC, a laptop, a PDA, a tablet PC, a smartphone, or a similar device. The processor 660 generates a route from the destination location. The interface 665 presents the destination location and could be embodied as a speaker, a display, a touchscreen, or a similar device capable of presenting the destination location. The memory 670 may store the destination location. The receiver 675 accepts the destination location and any additional data from either the computing device 630 or the server 605.

In the context of the invention, the method may be implemented by operating portion(s) of the wireless network to execute a sequence of machine-readable instructions. For example, operating portions could be the PC 155, the navigation device 105, or the server 125. The instructions can reside in various types of data storage primary, secondary, or tertiary media. For example, the media may comprise random access memory (RAM) (shown as the memory 620, the memory 635, or the memory 660) accessible by, or residing within, the components of the wireless network. Whether contained in RAM, a diskette, or other secondary storage media, the instructions may be stored on a variety of machine-readable data storage media, such as non-volatile storage (e.g., a conventional "hard drive" or a RAID array), magnetic tape, electronic read-only memory (e.g., ROM, EPROM, or EEPROM), flash memory cards, an optical storage device (e.g. CD-ROM, DVD, digital optical tape), paper "punch" cards, or other suitable data storage media.

Although selected embodiments have been illustrated and described in detail, it will be understood that various substitutions and alterations can be made therein without departing from the spirit and scope of the present invention, as defined by the following claims.

What is claimed is:

1. A navigation device, comprising:
   a receiver capable of receiving a package comprising a destination location and a message from a server over a wireless network, wherein the destination location and message are generated by a computing device, wherein the navigation device and the computing device are not the same device;
   a memory; and
   a processor, wherein the processor is configured with processor-executable instructions to perform operations comprising:
      notifying a user of receipt of the package;
      providing an option of accepting or rejecting the package to the user;
      receiving a user input of acceptance or rejection of the package; and
      upon receiving a user input of acceptance of the package, causing an acknowledgement to be sent to the server and performing an operation selected from the group consisting of storing the package in the memory for later retrieval and generating a route based on the destination location.

2. The navigation device of claim 1, further comprising an interface which communicates the route to a user.

3. The navigation device of claim 1, wherein the package further comprises additional data associated with the destination location and the processor is capable of processing the additional data.

4. A computing device, comprising:
   a processor capable of generating a package comprising a destination location and a message, wherein the package is capable of being rejected, or being accepted and processed by one or more target navigation devices to generate a route to the destination location, wherein the one or more target navigation devices and the computing device are not the same device; and
   a connection capable of interacting with a first interface presented by a server, sending the destination location to the server through the first interface, and receive a negative acknowledgement of from the server if none of the one or more target navigation devices accept the package within a predetermined time period, wherein the computing device and the server are not the same device.

5. The computing device of claim 4, further comprising a second interface adapted to accept user input of the destination location.

6. The computing device of claim 4, wherein the connection is capable of sending the package to the server over a wireless network.

7. The computing device of claim 4, wherein the processor automatically generates the destination location as a current location of the computing device.

8. The computing device of claim 7, wherein the current location is determined using a global positioning system.

9. A server, comprising:
   a processor;
   memory coupled to the processor; and
   a connection capable of receiving a package comprising a destination location and a message from an origination device, wirelessly transmitting the package to one or more target navigation devices, receive acknowledgements of package acceptance from the one or more target navigation devices, and send a negative acknowledgement to the originating device if none of the one or more target navigation devices accept the package within a predetermined time period, wherein the destination location is capable of being processed by the one or more target navigation devices to generate a route to the destination location, and wherein the origination device and the one or more target navigation devices are not the same device.

10. The server of claim 9, further comprising an interface which is presented to the originating device through the connection for generating the destination location of the package at the origination device.

11. A navigation device, comprising:
  means for receiving a package comprising a destination location and a message from a server over a wireless network, wherein the destination location and message are generated by a computing device, wherein the navigation device and the computing device are not the same device;
  a memory;
  means for notifying a user of receipt of the package;
  means for providing an option of accepting or rejecting the package to the user;
  means for receiving user input of acceptance or rejection of the package; and
  means for causing an acknowledgement to be sent to the server and performing an operation selected from the group consisting of storing the package in the memory for later retrieval and generating a route based on the destination location upon receiving user input of acceptance of the package.

12. The navigation device of claim 11, further comprising a means for communicating the route to a user.

13. The navigation device of claim 11, further comprising means for processing additional data included in the package which is associated with the destination location.

14. The navigation device of claim 1, wherein the navigation device receives and processes signals from navigation satellites.

15. The navigation device of claim 14, wherein the navigation satellites are part of a global positioning system.

16. The navigation device of claim 1, wherein the navigation device comprises one of a personal computer, a laptop, a personal digital assistant, a tablet PC, and a smartphone.

17. The navigation device of claim 2, wherein the interface comprises one of speaker, a display, and a touchscreen.

18. The navigation device of claim 11, wherein the navigation device comprises means for receiving and processing signals from navigation satellites.

19. The navigation device of claim 18, wherein the navigation satellites are part of a global positioning system.

20. The navigation device of claim 11, wherein the navigation device comprises one of a personal computer, a laptop, a personal digital assistant, a tablet PC, and a smartphone.

21. The navigation device of claim 12, wherein the means for communicating the route to a user comprises one of speaker, a display, and a touchscreen.

22. A method for providing information with a navigation device, comprising:
  receiving a package comprising a destination location and a message from a server over a wireless network, wherein the destination location is generated by a computing device, wherein the navigation device and the computing device are not the same device;
  notifying a user of receipt of the package;
  providing an option of accepting or rejecting the package to the user;
  receiving a user input of acceptance or rejection of the package; and
  upon receiving a user input of acceptance of the package, causing an acknowledgement to be sent to the server and performing an operation selected from the group consisting of storing the package in the memory for later retrieval and generating a route based on the destination location.

23. The method of claim 22, further comprising communicating the route to a user.

24. The method of claim 22, further comprising processing additional data included in the package which is associated with the destination location.

25. The method of claim 22, further comprising receiving and processing signals from navigation satellites.

26. The method of claim 25, wherein the navigation satellites are part of a global positioning system.

27. The method of claim 22, wherein the navigation device comprises one of a personal computer, a laptop, a personal digital assistant, a tablet PC, and a smartphone.

28. The method of claim 23, wherein communicating the route to a user further comprises communicating the route to the user with one of speaker, a display, and a touchscreen.

29. A non-transitory computer-readable storage medium having stored thereon processor executable instructions configured to cause a navigation device to perform operations comprising:
  receiving a package comprising a destination location and a message from a server over a wireless network, wherein the destination location is generated by a computing device, wherein the navigation device and the computing device are not the same device;
  notifying a user of receipt of the package;
  providing an option of accepting or rejecting the package to the user;
  receiving a user input of acceptance or rejection of the package; and
  upon receiving a user input of acceptance of the package, causing an acknowledgement to be sent to the server and performing an operation selected from the group consisting of storing the package in the memory for later retrieval and generating a route based on the destination location.

30. The non-transitory computer-readable storage medium of claim 29, wherein the the stored processor executable instructions are further configured to cause the navigation device to perform operations communicating the route to a user.

31. The non-transitory computer-readable storage medium of claim 29, wherein the the stored processor executable instructions are further configured to cause the navigation device to perform operations processing additional data included in the package which is associated with the destination location.

32. The non-transitory computer-readable storage medium of claim 29, wherein the the stored processor executable instructions are further configured to cause the navigation device to perform operations receiving and processing signals from navigation satellites.

33. The non-transitory computer-readable storage medium of claim 32, wherein the navigation satellites are part of a global positioning system.

34. The non-transitory computer-readable storage medium of claim 29, wherein the navigation device comprises one of a personal computer, a laptop, a personal digital assistant, a tablet PC, and a smartphone.

35. The non-transitory computer-readable storage medium of claim 30, wherein communicating the route to a user further comprises communicating the route to the user with one of speaker, a display, and a touchscreen.

36. The computing device of claim 5, wherein the second interface comprises at least one of a keypad, a touchscreen, a voice response system, a mouse, and a keyboard.

37. The computing device of claim 4, wherein the first interface comprises at least one of a keyboard, a mouse, a touchscreen, a webpage, a client application, and a server application capable of accepting the package.

38. The computing device of claim 6, wherein the connection comprises at least one of a local area network, a modem, and a wireless connection.

39. A method for providing information with a computing device, comprising:
   generating a package comprising a destination location and a message, wherein the package is capable of being rejected, or being accepted and processed by one or more target navigation devices and the computing device are not the same device; and
   interacting with a first interface presented by a server, sending the destination location to the server through the first interface, and receive a negative acknowledgement from the server if none of the one or more target navigation devices accept the package within a predetermined time period, wherein the computing device and the server are not the same device.

40. The method of claim 39, further comprising accepting user input of the destination location with a second interface.

41. The method of claim 39, further comprising sending the package to the server over a wireless network.

42. The method of claim 39, further comprising automatically generating the destination location as a current location of the computing device.

43. The method of claim 42, wherein the current location is determined using a satellite navigation system.

44. The method of claim 40, wherein the second interface comprises at least one of a keypad, a touchscreen, a voice response system, a mouse, and a keyboard.

45. The method of claim 39, wherein the first interface comprises at least one of a keyboard, a mouse, a touchscreen, a webpage, a client application, and a server application capable of accepting the package.

46. The method of claim 39, wherein sending the package to the server over a wireless network further comprise sending the package with at least one of a local area network, a modem, and a wireless connection.

47. A computing device, comprising:
   means for generating a package comprising a destination location and a message, wherein the package is capable of being rejected, or being accepted and processed by one or more target navigation device to generate a route to the destination location, wherein the one or more target navigation devices and the computing device are not the same device;
   means for interacting with a first interface presented by a server;
   means for sending the destination location to the server through the first interface; and
   means for receiving a negative acknowledgement of from the server if none of the one or more target navigation devices accept the package within a predetermined time period,
   wherein the computing device and the server are not the same device.

48. The computing device of claim 47, further comprising means for accepting user input of the destination location of the package with a second interface.

49. The computing device of claim 47, further comprising means for sending the package to the server over a wireless network.

50. The computing device of claim 47, further comprising means for automatically generating the destination location as a current location of the computing device.

51. The computing device of claim 50, wherein the current location is determined using a satellite navigation system.

52. The computing device of claim 47, wherein the second interface comprises at least one of a keypad, a touchscreen, a voice response system, a mouse, and a keyboard.

53. The computing device of claim 47, wherein the first interface comprises at least one of a keyboard, a mouse, a touchscreen, a webpage, a client application, and a server application capable of accepting the package.

54. The computing device of claim 47, wherein the means for sending the package to the server over a wireless network further comprises means for sending the destination location with at least one of a local area network, a modem, and a wireless connection.

55. A non-transitory computer-readable storage medium having stored thereon processor executable instructions configured to cause a computing device to perform operations comprising:
   generating a package comprising a destination location and a message, wherein the package is capable of being rejected, or being accepted and processed by one or more target navigation devices to generate a route to the destination location, wherein the one or more target navigation devices and the computing device are not the same device;
   interacting with a first interface presented by a server;
   sending the destination location to the server through the first interface; and
   receiving a negative acknowledgement of from the server if none of the one or more target navigation devices accept the package within a predetermined time period,
   wherein the computing device and the server are not the same device.

56. The non-transitory computer-readable storage medium of claim 55, wherein the stored processor executable instructions further configured to cause the computing device to perform operations accepting user input of the destination location with a second interface.

57. The non-transitory computer-readable storage medium of claim 55, wherein the stored processor executable instructions further configured to cause the computing device to perform operations sending the destination location to the server over a wireless network.

58. The non-transitory computer-readable storage medium of claim 55, wherein the stored processor executable instructions further configured to cause the computing device to perform operations automatically generating the destination location based on a current location of the computing device.

59. The non-transitory computer-readable storage medium of claim 58, wherein the current location is determined using a satellite navigation system.

60. The non-transitory computer-readable storage medium of claim 56, wherein the second interface comprises at least one of a keypad, a touchscreen, a voice response system, a mouse, and a keyboard.

61. The non-transitory computer-readable storage medium of claim 55, wherein the first interface comprises at least one of a keyboard, a mouse, a touchscreen, a webpage, a client application, and a server application capable of accepting the package.

62. The non-transitory computer-readable storage medium of claim 55, wherein sending the package to the server over a wireless network further comprises sending the package with at least one of a local area network, a modem, and a wireless connection.

63. The server of claim 10, wherein the interface comprises at least one of a keyboard, a mouse, a touchscreen, a webpage, a client application, and a server application capable of accepting the package.

64. The server of claim 9, wherein the connection comprises at least one of a local area network, a modem, and a wireless connection.

65. The server of claim 9, wherein the connection transmits the package using at least one of SMS, TCP/IP, UDP/IP, and e-mail.

66. A method for providing information with a server, comprising:
   receiving a package comprising a destination location and a message from an origination device;
   wirelessly transmitting the package to one or more target navigation devices, wherein the package is capable of being rejected, or being accepted and processed by the one or more target navigation devices to generate a route to the destination location; and
   sending a negative acknowledgement to the originating device if none of the one or more target navigation devices accept the package within a predetermined time period, wherein the origination device and the one or more target navigation devices are not the same device.

67. The method of claim 66, further comprising presenting an interface to the originating device through a connection for generating the package at the origination device.

68. The method of claim 67, wherein the interface comprises at least one of a keyboard, a mouse, a touchscreen, a webpage, a client application, and a server application capable of accepting the package.

69. The method of claim 67, wherein the connection comprises at least one of a local area network, a modem, and a wireless connection.

70. The method of claim 67, wherein the connection transmits the package using at least one of SMS, TCP/IP, UDP/IP, and e-mail.

71. A server, comprising:
   means for receiving a package comprising a destination location and a message from an origination device;
   means for wirelessly transmitting the package to one or more target navigation devices, wherein the package is capable of being rejected, or being accepted and processed by the one or more target navigation devices to generate a route to the destination location; and
   means for sending a negative acknowledgement to the originating device if none of the one or more target navigation devices accept the package within a predetermined time period,
   wherein the origination device and the one or more target navigation devices are not the same device.

72. The server of claim 71, further comprising means for presenting an interface to the originating device through a connection for generating the package at the origination device.

73. The server of claim 72, wherein the interface comprises at least one of a keyboard, a mouse, a touchscreen, a webpage, a client application, and a server application capable of accepting the package.

74. The server of claim 72, wherein the connection comprises at least one of a local area network, a modem, and a wireless connection.

75. The server of claim 72, wherein the connection transmits the package using at least one of SMS, TCP/IP, UDP/IP, and e-mail.

76. A non-transitory computer-readable storage medium having stored thereon processor executable instructions configured to cause a navigation device to perform operations comprising:
   receiving a package comprising a destination location and a message from an origination device;
   wirelessly transmitting the package to one or more target navigation devices, wherein the package is capable of being rejected, or being accepted and processed by the one or more target navigation devices to generate a route to the destination location; and
   sending a negative acknowledgement to the originating device if none of the one or more target navigation devices accept the package within a predetermined time period, wherein the origination device and the one or more target navigation devices are not the same device.

77. The non-transitory computer-readable storage medium of claim 76, wherein the stored processor executable instructions are further configured to cause a navigation device to perform operations presenting an interface to the originating device through a connection for generating the package at the origination device.

78. The non-transitory computer-readable storage medium of claim 77, wherein the interface comprises at least one of a keyboard, a mouse, a touchscreen, a webpage, a client application, and a server application capable of accepting the package.

79. The non-transitory computer-readable storage medium of claim 77, wherein the connection comprises at least one of a local area network, a modem, and a wireless connection.

80. The non-transitory computer-readable storage medium of claim 77, wherein the connection transmits the package using at least one of SMS, TCP/IP, UDP/IP, and e-mail.

* * * * *